United States Patent
Shao et al.

(10) Patent No.: US 11,843,515 B2
(45) Date of Patent: *Dec. 12, 2023

(54) PEER RISK BENCHMARKING USING GENERATIVE ADVERSARIAL NETWORKS

(71) Applicant: Cisco Technology, Inc., San Jose, CA (US)

(72) Inventors: Qihong Shao, Clyde Hill, WA (US); David John Zacks, Vancouver (CA); Xinjun Zhang, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/067,068

(22) Filed: Dec. 16, 2022

(65) Prior Publication Data
US 2023/0118857 A1   Apr. 20, 2023

Related U.S. Application Data

(63) Continuation of application No. 17/704,449, filed on Mar. 25, 2022, now Pat. No. 11,533,241, which is a
(Continued)

(51) Int. Cl.
*G06F 15/173* (2006.01)
*H04L 41/14* (2022.01)
(Continued)

(52) U.S. Cl.
CPC ............ *H04L 41/145* (2013.01); *H04L 41/12* (2013.01); *H04L 41/147* (2013.01);
(Continued)

(58) Field of Classification Search
CPC . H04L 41/145; H04L 41/5038; H04L 41/147; H04L 43/06; H04L 41/12; H04L 43/0817; H04L 41/5067; H04L 43/045
See application file for complete search history.

(56) References Cited

U.S. PATENT DOCUMENTS 10,616,257 B1   4/2020   Soulhi et al.
2014/0237545 A1   8/2014   Mylavarapu et al.
(Continued)

FOREIGN PATENT DOCUMENTS

WO   2020018392 A1   1/2020

OTHER PUBLICATIONS

Ian J. Goodfellow et al., "Generative Adversarial Nets", 2014, retrieved from Internet Oct. 22, 2020, 9 pages; https://papers.nips.cc/paper/5423-generative adversarial-nets.pdf.
(Continued)

*Primary Examiner* — Padma Mundur
(74) *Attorney, Agent, or Firm* — Edell, Shapiro & Finnan, LLC

(57) ABSTRACT

A method, computer system, and computer program product are provided for peer risk benchmarking. Customer data for a first network is obtained, wherein the customer data comprises a role of one or more network devices in the first network and a plurality of risk reports corresponding to the one or more network devices, and wherein each risk report is associated with a particular dimension of a plurality of dimensions of risk for the one or more network devices. A network profile image is generated by processing the plurality of risk reports. A generative adversarial network generates a synthetic network profile image from the network profile image, wherein the synthetic network profile image does not include the customer data. A second network is evaluated using the synthetic network profile image to identify differences between the first network and the second network.

20 Claims, 10 Drawing Sheets

Related U.S. Application Data continuation of application No. 17/077,073, filed on Oct. 22, 2020, now Pat. No. 11,316,750.

(51) Int. Cl.
| | |
|---|---|
| *H04L 41/12* | (2022.01) |
| *H04L 41/147* | (2022.01) |
| *H04L 41/5067* | (2022.01) |
| *H04L 43/045* | (2022.01) |
| *H04L 43/06* | (2022.01) |
| *H04L 43/0817* | (2022.01) |
| *H04L 43/55* | (2022.01) |

(52) U.S. Cl.
CPC ........ *H04L 41/5067* (2013.01); *H04L 43/045* (2013.01); *H04L 43/06* (2013.01); *H04L 43/0817* (2013.01); *H04L 43/55* (2022.05)

(56) References Cited

U.S. PATENT DOCUMENTS

| | | |
|---|---|---|
| 2014/0329461 A1 | 11/2014 | Ramachandran et al. |
| 2015/0373043 A1 | 12/2015 | Wang et al. |
| 2019/0124104 A1 | 4/2019 | Apostopoulos |
| 2019/0149425 A1 | 5/2019 | Larish et al. |
| 2019/0182287 A1 | 6/2019 | Hanley et al. |
| 2019/0268366 A1 | 8/2019 | Zeng et al. |
| 2020/0067930 A1* | 2/2020 | Goeringer ............ H04L 63/0236 |
| 2020/0076835 A1 | 3/2020 | Ladnai et al. |
| 2020/0162341 A1 | 5/2020 | Vasseur et al. |
| 2020/0195679 A1 | 6/2020 | Du |
| 2020/0202268 A1 | 6/2020 | Retna et al. |
| 2020/0218937 A1 | 7/2020 | Visentini Scarzanella et al. |
| 2020/0367078 A1 | 11/2020 | Deb et al. |
| 2020/0410362 A1 | 12/2020 | Turner et al. |
| 2021/0197335 A1 | 7/2021 | Wang et al. |

OTHER PUBLICATIONS

Sahar Tavakoli et al., "Learning Social Graph Topologies using Generative Adversarial Neural Networks", Jun. 2017, retrieved from Internet Oct. 22, 2020, 10 pages; http://ial.eecs.ucf.edu/pdf/Sukthankar-SBP2017LateBreak.pdf.

Tsung-Yen Yang et al., "Learning Informative and Private Representations via Generative Adversarial Networks", retrieved from Internet Oct. 22, 2020, 10 pages; http://www.cbrinton.net/18bigdata.pdf.

Hu, Jingjing et al., "I-HMM-Based Multidimensional Network Security Risk Assessment", Digital Object Identifier 10.1109/ACCESS.2019.2961997, Dec. 24, 2019, 12 pages.

Jason Devlin et al.,"BERT: Pre-training of Deep Bidirectional Transformers for Language Understanding", Association for Computational Linguistics, https://www.aclweb.org/anthology/N19-1423/, Jun. 2019, 16 pages.

Hu Xu et al., "Double Embeddings and CNN-based Sequence Labeling for Aspect Extraction", Association for Computational Linguistics, https://www.aclweb.org/anthology/P18-2094/, Jul. 2018, 7 pages.

Qihong Shao et al., "Self-Adaptive Anomaly Detection With Deep Reinforcement Learning and Topology", Technical Disclosure Commons, https://www.tdcommons.org/dpubs_series/4369, Jan. 6, 2021, 14 pages.

\* cited by examiner

PEER RISK BENCHMARKING USING GENERATIVE ADVERSARIAL NETWORKS

PRIORITY CLAIM

This application claims priority to U.S. Non-Provisional application Ser. No. 17/704,449, filed Mar. 25, 2022, entitled "Peer Risk Benchmarking using Generative Adversarial Networks," which in turn claims priority to U.S. Pat. No. 11,316,750, filed Oct. 22, 2020, entitled "Peer Risk Benchmarking using Generative Adversarial Networks," the entirety of which are incorporated herein by reference.

TECHNICAL FIELD

The present disclosure relates to cybersecurity, and more specifically, to peer risk benchmarking using generalized adversarial networks.

BACKGROUND

In the field of cybersecurity, peer benchmarking refers to the comparing of an enterprise to other similar enterprises in order to make decisions, such as whether to upgrade, modify, or expand infrastructure components. Since much of a network's infrastructure can go unnoticed by end users, it can be difficult to justify making purchases to change the network in the absence of glaring performance issues. Thus, potential issues may often be identified by benchmarking a network against the networks of peers in order to bring awareness to the shortcomings of the benchmarked network. However, due to privacy concerns and other limitations, organizations are frequently unable to identify and obtain the data necessary to perform peer benchmarking.

DESCRIPTION OF EXAMPLE EMBODIMENTS

Overview

Figure 1:
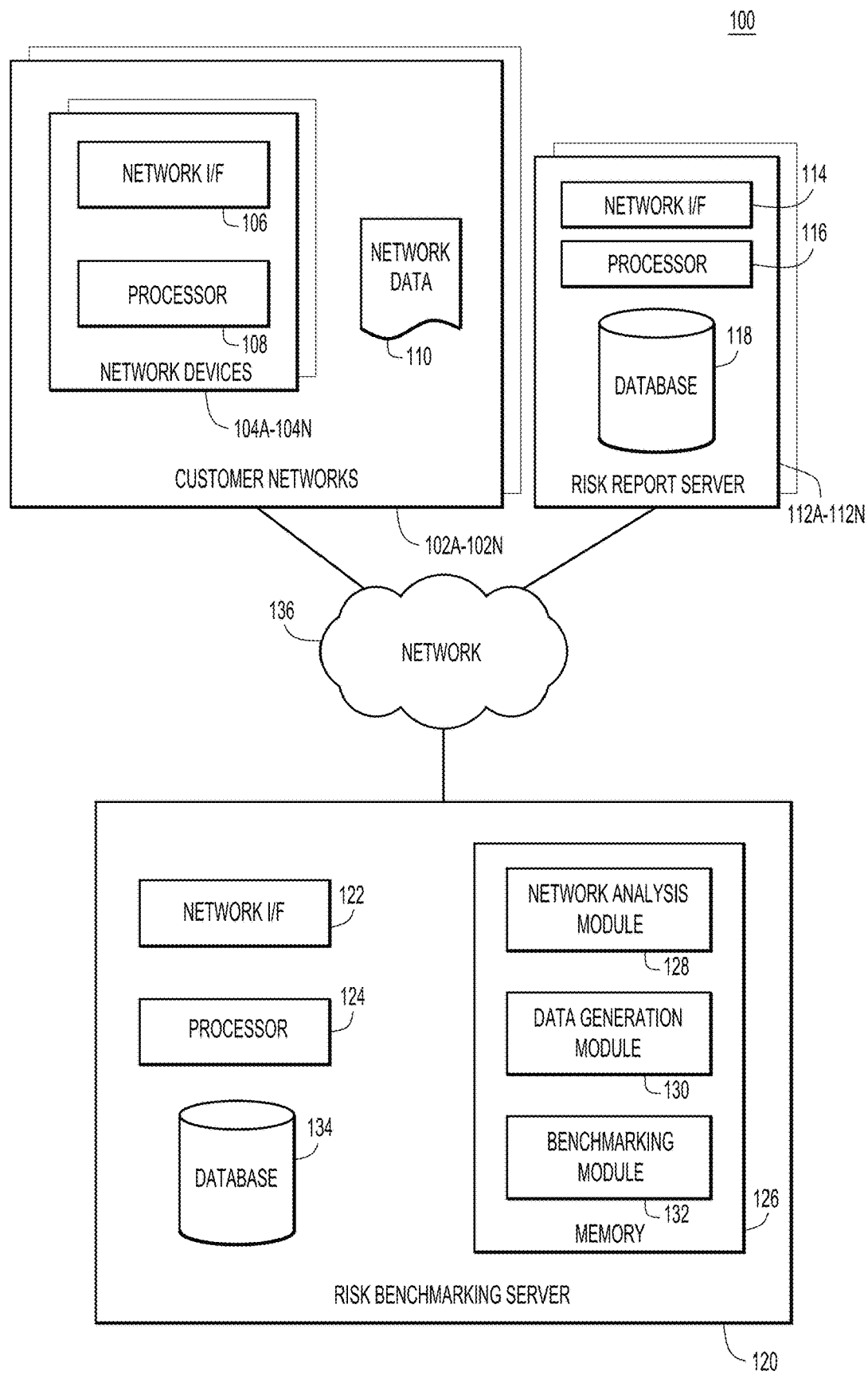
FIG. 1 is a block diagram depicting an environment for peer risk benchmarking, in accordance with an example embodiment.

According to one embodiment, techniques are provided for peer risk benchmarking. Customer data for a first network is obtained, wherein the customer data comprises a role of one or more network devices in the first network and a plurality of risk reports corresponding to the one or more network devices, and wherein each risk report is associated with a particular dimension of a plurality of dimensions of risk for the one or more network devices. A network profile image is generated by processing the plurality of risk reports. A generative adversarial network generates a synthetic network profile image from the network profile image, wherein the synthetic network profile image does not include the customer data. A second network is evaluated using the synthetic network profile image to identify differences between the first network and the second network.

EXAMPLE EMBODIMENTS

Embodiments are provided for cybersecurity, and more specifically, for peer risk benchmarking using generalized adversarial networks.

Peer benchmarking refers to comparing aspects of an enterprise, including networking and computing components, to other similar enterprises in order to make informed decisions. In the field of risk analysis, peer benchmarking may involve determining whether the particular network configuration of an organization exposes the organization to more or less risk as compared to other similar organizations (i.e., "peers"). For example, a particular version of an operating system used in network devices may be more susceptible to vulnerabilities compared to the operating system used by peers. When an organization identifies that its operating system version places the organization at greater risk, the organization may accordingly decide to upgrade network devices to a newer version of the operating system. Thus, peer risk benchmarking enables an organization to be aware when their infrastructure differs from the infrastructure of peers in terms of exposure to risk.

In order to perform peer risk benchmarking of a network, an organization analyzes data relating to the networks of peers. However, obtaining this data can be difficult due to data privacy issues. For example, an organization may not be able to share some data due to statutory requirements or because the data contains trade secrets. Moreover, some organizations may have unique infrastructure configurations, and thus have few comparable peers. Accordingly, present embodiments enable the generation of peer benchmarking data that simulates the data of an organization's network, but does not actually contain any of the organization's data. A machine learning model is trained to generate synthetic network profiles that accurately reflect an organization's risk across multiple dimensions. This simulated data can thus safely be shared with other organizations for benchmarking or other purposes. Accordingly, present embodiments enable the generation of peer benchmarking data that completely avoids exposure of private or sensitive data, and that enables the risk of networks to be assessed across a wide range of dimensions of risk.

It should be noted that references throughout this specification to features, advantages, or similar language herein do not imply that all of the features and advantages that may be realized with the embodiments disclosed herein should be, or are in, any single embodiment. Rather, language referring to the features and advantages is understood to mean that a specific feature, advantage, or characteristic described in connection with an embodiment is included in at least one embodiment. Thus, discussion of the features, advantages, and similar language, throughout this specification may, but do not necessarily, refer to the same embodiment.

Furthermore, the described features, advantages, and characteristics may be combined in any suitable manner in one or more embodiments. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages will become more fully apparent from the following drawings, description and appended claims, or may be learned by the practice of embodiments as set forth hereinafter.

Embodiments are now described in detail with reference to the figures. FIG. 1 is a block diagram depicting an environment 100 for peer risk benchmarking in accordance with an example embodiment. As depicted, environment 100 includes customer networks 102A-102N, one or more risk report servers 112A-112N, a risk benchmarking server 120, and a network 136. It is to be understood that the functional division among components of environment 100 have been chosen for purposes of explaining various embodiments and is not to be construed as a limiting example.

Customer networks 102A-102N each include one or more network devices 104A-104N and network data 110; each network device 104A-104N may include a network interface (I/F) 106 and at least one processor 108. In various embodiments, each network device 104A-104N may include a server, a router, a hub, a switch, a bridge, a gateway, a modem, a repeater, an access point, a firewall, an endpoint device (e.g., a laptop computer, a tablet computer, a netbook computer, a personal computer (PC), a desktop computer, a personal digital assistant (PDA), or a smart phone) or any other programmable electronic device capable of executing computer readable program instructions and performing networking-related operations in the respective customer networks 102A-102N. Moreover, the network devices 104A-104N may be virtual in the sense that they are embodied as software running on a computing device. Network interface 106 enables each network device 104A-104N to send and receive data over a network, such as network 138 and/or customer networks 102A-102N. In general, network devices 104A-104N may perform any networking or computing task, including transmitting, receiving, and/or processing of data obtained from, or provided to, network-accessible computing devices, including devices internal and/or external to customer networks 102A-102N. Each network device 104A-104N may include internal and external hardware components, as depicted and described in further detail with respect to FIG. 10.

Network data 110 for each customer network 102A-102N may include any data relating to dimensions of risk that are being assessed for customer networks 102A-102N in accordance with present embodiments. As such, network data 110 may include an inventory of network devices 104A-104N for a particular customer network 102A-102N, including hardware specifications, a list of installed software and firmware, roles of each network device 104A-104N in the particular customer network 102A-102N, and any other data or metadata. Thus, network data 110 can indicate device roles and/or the topology of any of customer networks 102A-102N.

Additionally or alternatively, network data 110 may include risk reports for one or more dimensions of risk. The risk reports can be obtained from one or more sources that are internal to and/or external to customer networks 102A-102N. For example, risk reports can be generated by network devices 104A-104N, and/or can be obtained from risk report servers 112A-112N.

The risk reports that are included in network data 110 may be categorized according to one or more dimensions of risk. Dimensions of risk can include a security advisories dimension, a field notices dimension, a bug reports dimension, a service requests dimension, a system logs dimension, an end-of-life dimension, a licensing dimension, and best practices dimension. Risk reports in a security advisories dimension may include security advisory reports, such as new viruses, worms, or other malware, zero-day vulnerabilities, current denial-of-service attacks, and the like. Risk reports in a field notices dimension may include upgrades, workarounds, or other changes to hardware and/or software of network devices 104A-104N. Risk reports in a bug reports dimension may include descriptions of bugs submitted automatically by network devices 104A-104N and/or by users of network devices 104A-104N. Bug reports can also be issued by third parties, such as vendors or developers, and can be obtained from servers associated with those third parties (e.g., risk report servers 112A-112N). Risk reports in a service requests dimension may include requests from users for some service to be provided by a network administrator, such as error troubleshooting to be provided, software to be installed, hardware to be upgraded, and the like. Risk reports in a systems log dimension can include any logs generated by network devices 104A-104N, either automatically or at the request of a user. Risk reports in an end-of-life dimension may indicate a lifecycle of the hardware and/or software, including a planned end date for customer support, updates, hotfixes, availability of replacement parts, and the like. Risk reports in a licensing dimension may include any information relating to licensed software, including terms of license agreements, duration of license agreements, and the like. Risk reports in a best practices dimension may include descriptions of recommended settings or configurations of the hardware and/or software components of network devices 104A-104N, such as recommendations to use a particular data encryption mechanism, a recommended firewall rule, a suggested password strength, and the like. Each risk report can also include an indication of a severity of risk, such as a "low" risk, "medium" risk, or "high" risk, or the risk severity can be indicated according to a numerical scale or other metric.

Risk report servers 112A-112N each include a network interface (I/F) 114, at least one processor 116, and a database 118. Each risk report server 112A-112N may include a rack-mounted server, or any other programmable electronic device capable of executing computer readable program instructions. Network interface 114 enables components of each risk report server 112A-112N to send and receive data over a network, such as network 136. Risk report servers 112A-112N may include internal and external hardware components, as depicted and described in further detail with respect to FIG. 10.

In general, each risk report server 112A-112N provides, or otherwise makes available, risk reports for networks of computing devices, such as customer networks 102A-102N and network devices 104A-104N. Each risk report server 112A-112N may be associated with one or more providers of hardware and/or software that is in use by any of network devices 104A-104N. Each risk report may indicate impacted hardware and/or software modules, and each risk report may include a description of the risk and/or the nature of the impact.

Database 118 may include any non-volatile storage media known in the art. For example, database 118 can be implemented with a tape library, optical library, one or more independent hard disk drives, or multiple hard disk drives in a redundant array of independent disks (RAID). Similarly, data in database 118 may conform to any suitable storage architecture known in the art, such as a file, a relational database, an object-oriented database, and/or one or more tables. Database 118 may store data relating to risk reports, including new and previous risk reports. Database 118 may make risk reports accessible, via network 136, to external entities, such as network devices 104A-104N of customer networks 102A-102N and risk benchmarking server 120. Additionally or alternatively, risk report servers 112A-112N may provide data stored in database 118 to external destinations, either on an ad hoc basis (e.g., as reports become available) or according to a predetermined schedule.

Risk benchmarking server 120 includes a network interface (I/F) 122, at least one processor 124, memory 126, and database 134. Memory 126 stores software instructions for a network analysis module 128, a data generation module 130, and a benchmarking module 132. Risk benchmarking server 120 may include a rack-mounted server, or any other programmable electronic device capable of executing computer readable program instructions. Network interface 122 enables components of risk benchmarking server 120 to send and receive data over a network, such as network 136. In general, risk benchmarking server 120 enables the assessment of risk for a computing network, such as any of customer networks 102A-102N. Risk benchmarking server 120 may include internal and external hardware components, as depicted and described in further detail with respect to FIG. 10.

Network analysis module 128, data generation module 130, and benchmarking module 132 may include one or more modules or units to perform various functions of the embodiments described below. Network analysis module 128, data generation module 130, and benchmarking module 132 may be implemented by any combination of any quantity of software and/or hardware modules or units, and may reside within memory 126 of risk benchmarking server 120 for execution by a processor, such as processor 124.

Network analysis module 128 may obtain and analyze customer data relating to a network (e.g., network data 110) in order to create a multidimensional assessment or representation of risk for the network. The values for each dimension of risk in a multidimensional assessment of risk can be normalized such that a multidimensional assessment of risk for one customer network can be compared to a multidimensional assessment of risk for another customer network. For example, for each dimension of risk, network analysis module 128 may determine a risk score that is normalized within a range of values, such as zero to five or zero to ten, with higher values indicating greater risk exposure.

In particular, network analysis module 128 may analyze network data 110 of any customer network 102A-102N to assess risk in any number of dimensions, including a security advisories dimension, a field notices dimension, a bug reports dimension, a service request dimension, a system logs dimension, a network device roles dimension, a network topology dimension, an end-of-life dimension, a licensing dimension, and a best practices dimension. In order to determine a risk score for a dimension of risk, network analysis module 128 may analyze all of the risk reports for that dimension, which are included in network data 110. In some embodiments, each risk report is associated with a particular value based on the content of the risk report, date and/or time of the risk report, and/or metadata associated with the risk report. In some embodiments, each risk report is assigned a particular value by a reviewer. These values can be processed using statistical or mathematical operations to obtain an overall risk score for the dimension of risk. For example, the values assigned to risk reports may be summed to obtain an overall risk score, or the risk score may be equal to the mean, median or mode value. The overall risk score for each dimension of risk may then be normalized and included in the multidimensional assessment of risk for the network.

In some embodiments, the security advisories, field notices, best practices, bug reports, bug reports, service requests, end-of-life, licensing dimensions and/or systems logs dimensions are scored based on predetermined values associated with the software and/or hardware elements impacted or otherwise described in the risk reports for each dimension. For example, a security advisory relating to a firewall security threat may have a higher predetermined score, indicating as greater exposure to risk, than a security advisory relating to a peripheral device such as a printer.

In some embodiments, the security advisories, field notices, best practices, bug reports, bug reports, service requests, end-of-life, licensing dimensions and/or systems logs dimensions are scored based on the time of each risk report. For example, older risk reports that indicate exposures to risk that have not yet been remediated may be associated with high risk scores. Similarly, risk can be scored in a licensing or end-of-life dimension based on the imminence of expiration of each licensed product or end of support for each product. For example, licenses whose expiration dates are upcoming (e.g., within a month) may be associated with more risk than licenses that will not expire for several months or years.

In some embodiments, the network device roles dimension is scored based on the roles of each network device 104A-104N in a network. For example, core devices can be assigned higher values than edge components; the values for all devices can then be processed to obtain an overall risk score. In some embodiments, the network topology dimension is scored based on the configuration of the network. For example, a network topology score can be predetermined based on whether the network conforms to a mesh topology, star topology, bus topology, ring topology, or hybrid topology.

In some embodiments, network analysis module 128 generates a network profile image representing the multidimensional assessment of risk for a network. For example, a radar chart can be constructed with a number of axes corresponding to the number of dimensions of risk that are assessed. Images generated by network analysis module 128 are depicted and described in further detail with respect to FIG. 4.

Data generation module 130 may generate synthetic data, based on the network profile images generated by network analysis module 128, that can be used for peer risk benchmarking. In particular, data generation module 130 may utilize a trained machine learning model to generate synthetic network profile images that are similar to the network profile images of actual networks (e.g., customer networks 102A-102N), but do not contain any actual customer data.

In some embodiments, data generation module 130 utilizes a conventional or other generative adversarial network to generate synthetic network profile images based on actual network profile images. A generative adversarial network includes a generator network that generates synthetic images, and a discriminator network that compares the generated synthetic images to the actual images to distinguish images produced by the generator from the data distribution of the actual images. In some embodiments, the generative adversarial network is a deep convolutional generative adversarial network in which the generator network and discriminator network are deep convolutional neural networks. Using the generative adversarial network, data generation module 130 outputs synthetic network profile images that are stored in database 134 for use in peer risk benchmarking. The generative adversarial network that may be used by data generation module 130 is depicted and described in further detail with respect to FIG. 6.

Benchmarking module 132 performs peer risk benchmarking by comparing network profile images of actual networks (e.g., customer networks 102A-102N) to synthetic profile images generated by data generation module 130. Since the synthetic profile images closely approximate the risk profile of actual networks but do not contain any data from those networks, benchmarking module 132 can accurately evaluate a customer network to determine how the network would compare to networks of peers in terms of risk. In order to evaluate a network, benchmarking module 132 may obtain a network profile image corresponding to the network from data generation module 130.

In particular, benchmarking module 132 may extract the risk score of each dimension of risk from a synthetic network profile image, and compare those risk scores to corresponding risk scores of an evaluated network. Benchmarking module 132 may evaluate a network against several synthetic datasets that are generated by data generation module 130 in order to determine how the evaluated network compares to its peers. For example, benchmarking module 132 may determine that an evaluated network ranks at a 95$^{th}$ percentile as compared to its peers in terms of one dimension of risk, but only ranks at a 50$^{th}$ percentile in another dimension of risk. Thus, benchmarking module 132 can identify particular dimensions of risk of an evaluated network that can be targeted for improvement.

Database 134 may include any non-volatile storage media known in the art. For example, database 134 can be implemented with a tape library, optical library, one or more independent hard disk drives, or multiple hard disk drives in a RAID. Similarly, data in database 134 may conform to any suitable storage architecture known in the art, such as a file, a relational database, an object-oriented database, and/or one or more tables. Database 134 may store data relating to peer risk benchmarking, including network profile images relating to customer networks 102A-102N, synthetic network profile images generated by data generation module 130, and data corresponding to actual and synthetic network profile images, such as risk scores for each dimension of risk. In some embodiments, database 134 only retains customer data (e.g., network data 110 obtained from customer networks 102A-102N and/or network profile images based upon network data 110) temporarily in order to evaluate customer networks and/or generate synthetic network profile images based on the customer data. In order to ensure data privacy, customer data may be deleted from database 134 once the data has been used for evaluation purposes and/or to generate synthetic network profile images.

Network 136 may include a local area network (LAN), a wide area network (WAN) such as the Internet, or a combination of the two, and includes wired, wireless, or fiber optic connections. In general, network 136 can be any combination of connections and protocols known in the art that will support communications between network devices 104A-104N of customer networks 102A-102N, risk report servers 112A-112N, and/or risk benchmarking server 120 via their respective network interfaces in accordance with the described embodiments.

Figure 2:
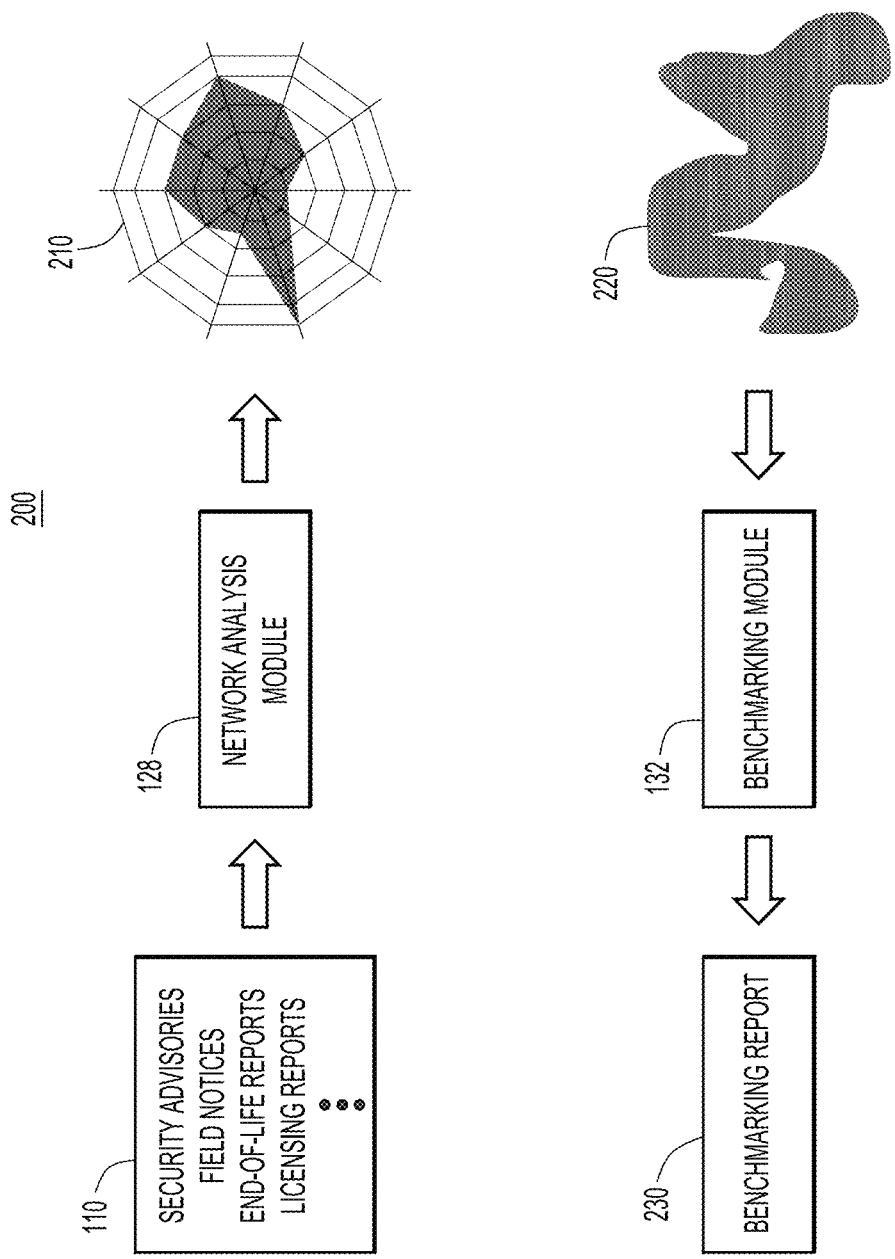
FIG. 2 is a block diagram depicting generation of peer risk benchmarking data, in accordance with an example embodiment.

Referring to FIG. 2, FIG. 2 is a block diagram 200 depicting generation of peer risk benchmarking data, in accordance with an example embodiment.

Initially, network data 110 from a customer network, such as any of customer networks 102A-102N, is obtained and provided to network analysis module 128. The network data 110 may include any risk reports, such as security advisories, field notices, bug reports, service requests, system logs, end-of-life reports, licensing reports, and best practices reports, as well as data relating to network device roles, and network topology. Network analysis module 128 may process the risk reports and network device roles and topology data to determine a risk score for each dimension of risk, which are normalized to a same range of values.

Using the normalized risk scores for each dimension of risk, network analysis module 128 can generate a risk assessment 210, which may include a radar chart having axes corresponding to the dimensions of risk. The risk scores for each dimension of risk can form vertices of a polygon, which can be processed to produce network profile image 220. The polygon extracted from risk assessment 210 can be transformed using conventional or other transform operations and/or upscaled using conventional or other upscaling techniques in order to generate network profile image 220. In some embodiments, the transform operations and/or upscaling applied to create network profile image 220 exaggerates features of the risk profile in order to more easily highlight differences when network profile image 220 is compared to synthetic network images during the benchmarking process.

Benchmarking module 132 may compare network profile image 220 to one or more synthetic network images, generated based on peer network data, in order to perform a multi-dimensional evaluation of the network profile image 220. For example, benchmarking module 132 may compare the shape of network profile image 220 to the shape of synthetic network images, identify areas where the shapes differ, and determine which dimensions of risk are associated with those areas. Moreover, benchmarking module 132 can quantify the difference by converting the shapes back to risk scores for each dimension of risk, thereby computing the numerical differences for each dimension of risk. A benchmarking report 230 may be output that summarizes differences in risk between the evaluated network and the synthesized data based on one or more peer networks.

Figure 3:
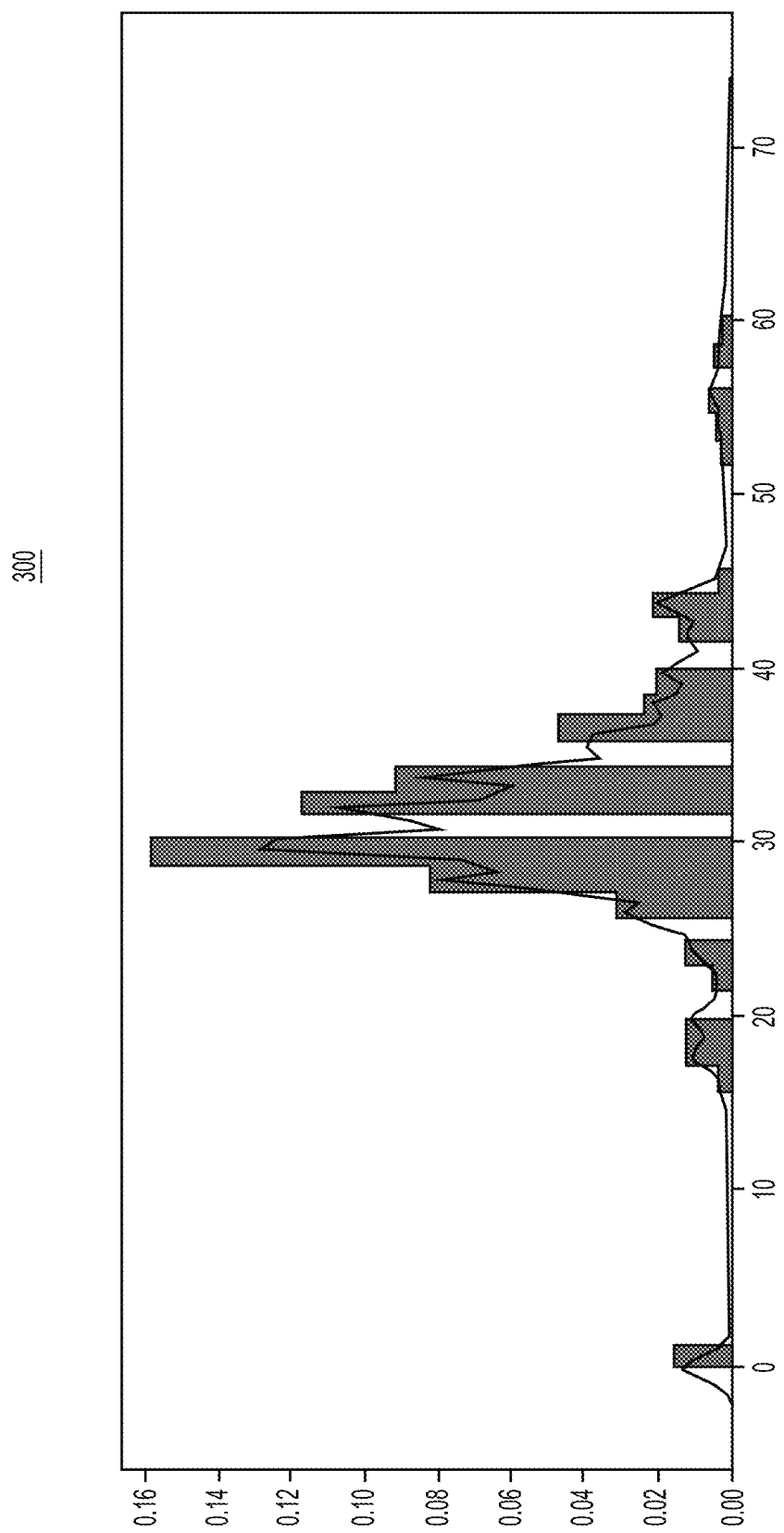
FIG. 3 is a histogram depicting a distribution of a dimension of risk, in accordance with an example embodiment.

Referring to FIG. 3, FIG. 3 is a histogram 300 depicting a distribution of a dimension of risk, in accordance with an example embodiment. As depicted, histogram 300 indicates a distribution of risk reports in a best practices medium dimension of risk. Each risk report may be provided a particular value, and risk reports sharing a same assigned value can be grouped. The number of risk reports in a group can then be counted, and the histogram can be constructed using normalized values. In the depicted example, risk reports having an assigned value of around 30 are the most common, as indicated by the normalized count of 0.16. An overall score for the best practices medium dimension of risk can be determined by selecting the highest value (e.g., the value associated with the maximum on histogram 300) and normalizing that value. In particular, the value may be normalized by subtracting the mean of all group counts from the largest group count, and then dividing the resulting value by the standard deviation of the group count, resulting in an overall risk score.

Figure 4:
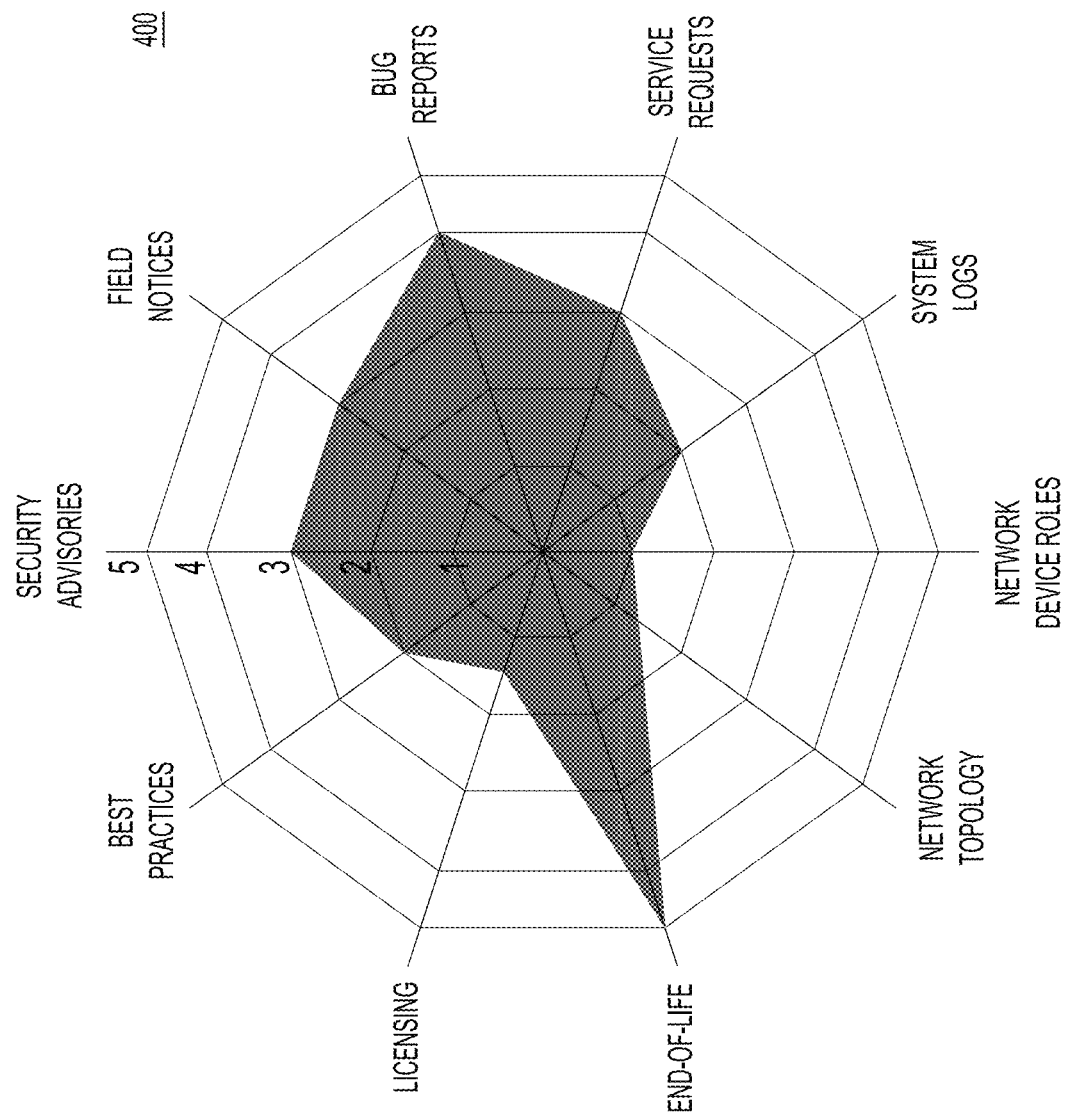
FIG. 4 is a radar chart depicting a multi-dimensional assessment of risk, in accordance with an example embodiment.

Referring to FIG. 4, FIG. 4 is a radar chart 400 depicting a multidimensional assessment of risk, in accordance with an example embodiment. As depicted, radar chart 400 assesses risk in a security advisories dimension, a field notices dimension, a bug reports dimension, a service request dimension, a system logs dimension, a network device roles dimension, a network topology dimension, an end-of-life dimension, a licensing dimension, and a best practices dimension. The individual risk scores for each dimension can be indicated on radar chart 400, with values associated with increased exposure to risk being farther from the origin. Thus, radar chart 400 represents operational and/or performance risk for a network, such as any of customer networks 102A-102N. An image representing the risk profile of the network can be extracted from radar chart 400 by generating a polygon having vertices defined by the risk scores along each axis, where the relative position of the risk scores indicate the shape of the polygon.

Figure 5A:
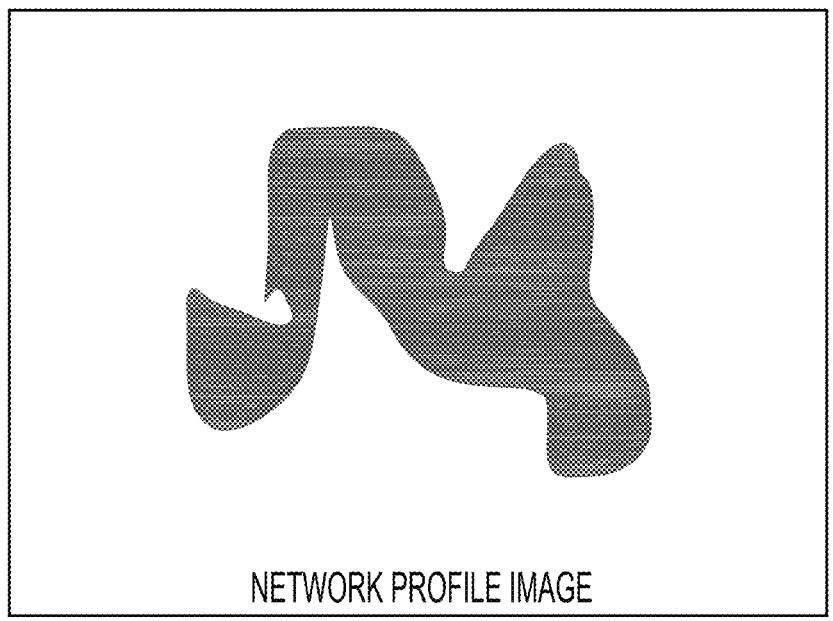
FIGS. 5A and 5B are diagrams depicting network profile images, in accordance with an example embodiment.

Referring to FIG. 5A, FIG. 5A is a diagram depicting a network profile image 500, in accordance with an example embodiment. Network profile image 500 may thus be a risk profile distribution that represents risk of an actual customer network based on network data (e.g., network data 110). Network profile image 500 may be generated based on a polygon extracted from a radar chart, such as radar chart 400 of FIG. 4, in which risk values for each dimension of risk are plotted on corresponding axes. Next, one or more transform operations and/or upscaling may be applied to the polygon to generate network profile image 500.

Figure 5B:
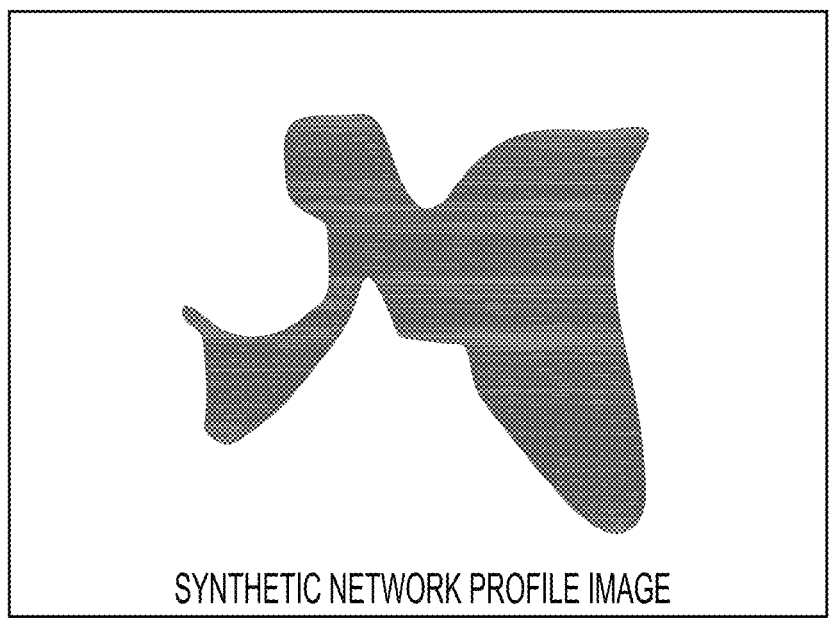

Referring to FIG. 5B, FIG. 5B is a diagram depicting a synthetic network profile image 550, in accordance with an example embodiment. Synthetic network profile image 550 may be a generated customer profile distribution produced by inputting the network profile image 500 into a generative adversarial network. Thus, synthetic network profile image 550 is similar to network profile image 500 in terms of the values of dimensions of risk represented in each image, but synthetic network profile image 550 does not include any of the underlying data (e.g., network data 110) used to generate network profile image 500.

Figure 6:
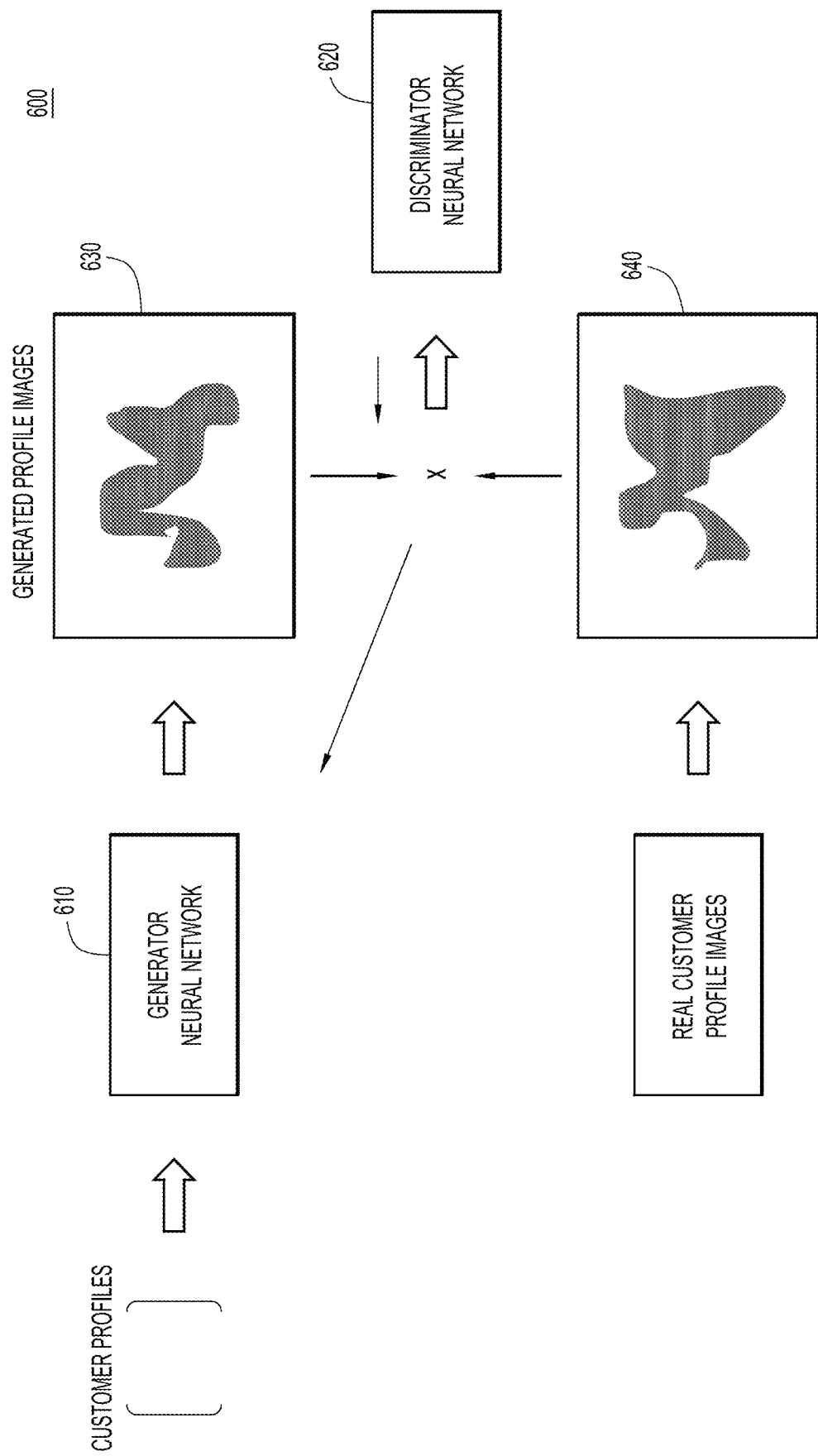
FIG. 6 is a block diagram depicting a generative adversarial network in accordance with an example embodiment.

Referring to FIG. 6, FIG. 6 is a block diagram depicting a generative adversarial network 600 in accordance with an example embodiment. Generative adversarial network 600 includes a generator network 610 and a discriminator network 620. In some embodiments, generator network 610 and discriminator network 620 are deep convolutional neural networks. Generative adversarial network 600 may be trained using network profile images based a sample network. In particular, the risk scores for each dimension of risk of a network are converted to 32-by-32 image arrays for each of three classes of network devices, such as a data center switch class, a local area network switch class, and a router class.

Generator network 610 may process customer profile images to generate similar images that do not include customer data (e.g., generated profile images 630). In particular, generator network 610 may map vectors of shapes, obtained by constructing radar charts using multidimensional risk scores, to the 32-by-32 image arrays for each category of network device. Discriminator network 620 may then map the image arrays to a binary score that estimates the probability that the image is real (e.g., generated based on actual customer network data) or not. Generative adversarial network 600 chains generator network 610 and discriminator network 620 together so that latent space vectors are mapped to the estimated probabilities of images being real as assessed by discriminator network 620. Discriminator network 620 is trained using labeled data, such as images that are labeled as based on actual customer networks (e.g., real customer profile images 640), and images that are labeled as not based on actual customer networks (e.g., generated profile images 630 and/or other images). During training, the weights of elements in generator network 610 are iteratively adjusted using a loss function in order to output images that are perceived by discriminator network 620 as real, despite being generated by generator network 610. When generator network 610 is able to generate images that are incorrectly assessed as real by discriminator network 620 beyond a threshold rate (e.g., 9 times out of 10 or 90%), training is complete.

Figure 7:
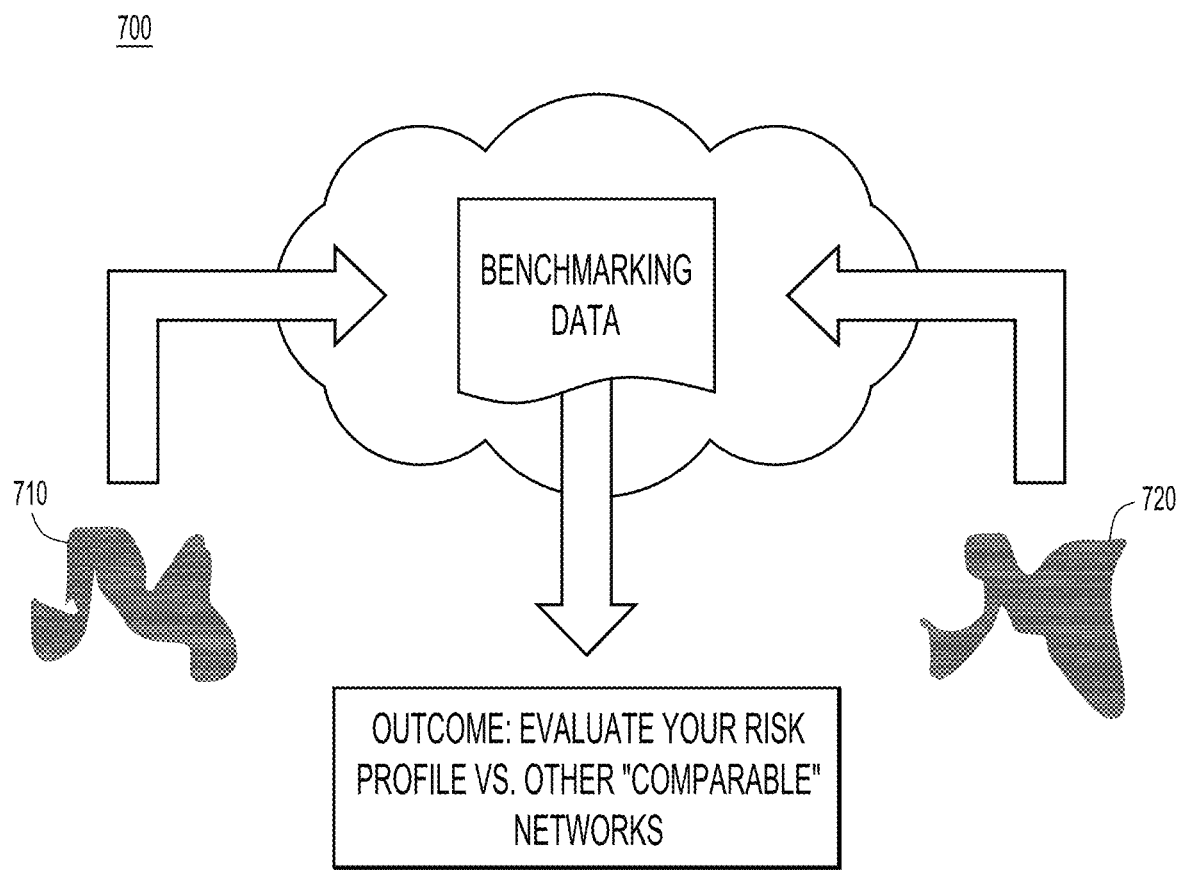
FIG. 7 is a block diagram depicting an evaluation of risk, in accordance with an example embodiment.

Referring to FIG. 7, FIG. 7 is a block diagram 700 depicting an evaluation of risk, in accordance with an example embodiment. A network profile image 710, based on actual network data of a customer network being evaluated, can be provided to a computing device or module, such as benchmarking module 132 of risk benchmarking server 120. One or more synthetic network profile images 720 are also provided, and network profile image 710 is compared to each provided synthetic network profile image 720. In some embodiments, benchmarking is performed on a cloud platform. Benchmarking data is generated that highlights any differences in any dimension of risk between the evaluated network and the synthetic peer risk benchmarking data represented by the one or more synthetic network profile images 720. For example, the benchmarking data may indicate that the evaluated network is ranked at a certain percentile of risk, for each dimension of risk assessed, as compared to peers.

Figure 8:
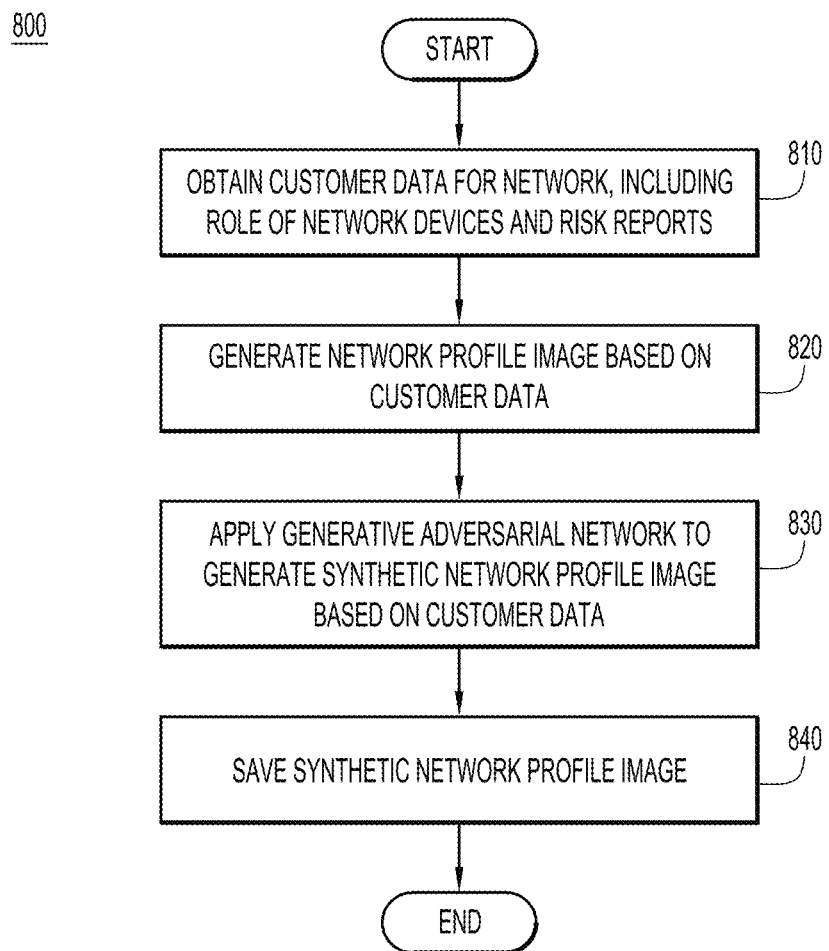
FIG. 8 is a flow chart depicting a method for generating synthetic peer risk benchmarking data, in accordance with an example embodiment.

Referring to FIG. 8, FIG. 8 is a flow chart depicting a method 800 for generating synthetic peer risk benchmarking data, in accordance with an example embodiment.

Customer data for a network, including the roles of network devices and risk reports, is obtained at operation 810. The customer data may include a description of roles of network devices and the topology of the network, as well as risk reports for each dimension of risk that is being assessed. For example, risk reports may include best practices, security advisories, field notices, bug reports, service requests, system logs, end-of-life reports, licensing reports, and the like. Additionally, risk reports can be divided into further dimensions based on the severity of reports, such as "low" or "high", for each risk report dimension.

A network profile image is generated based on the customer data at operation 820. Initially, a risk score may be determined for each dimension of risk based on the corresponding risk reports, descriptions of roles of network devices, and/or topology of the network. The resulting individual risk scores can together be converted into a network profile image that depicts risk across all assessed dimensions. For example, the risk scores may be used to construct a radar chart, such as radar chart 400 shown in FIG. 4, from which a polygon-shaped network profile image can be extracted. Transform operations and/or upscaling operations may be applied to finalize the network profile image, and may exaggerate features that represent risk in order to more easily identify differences between compared images.

A generative adversarial network is applied to generate a synthetic network profile image based on the customer data at operation 830. The generative adversarial network may be trained to generate synthetic network profile images that are similar to real network profile images, but do not contain any actual network data from real networks (e.g., customer networks 102A-102N).

The synthetic network profile image is saved at operation 840. Synthetic network profile images may be stored for later use in peer benchmarking tasks. For example, the synthetic network profile image may be stored in database 134 of risk benchmarking server 120. In some embodiments, when a synthetic network profile image is generated and stored, the underlying network data and the network profile image used to generate the synthetic network profile image is securely deleted to ensure data privacy.

Figure 9:
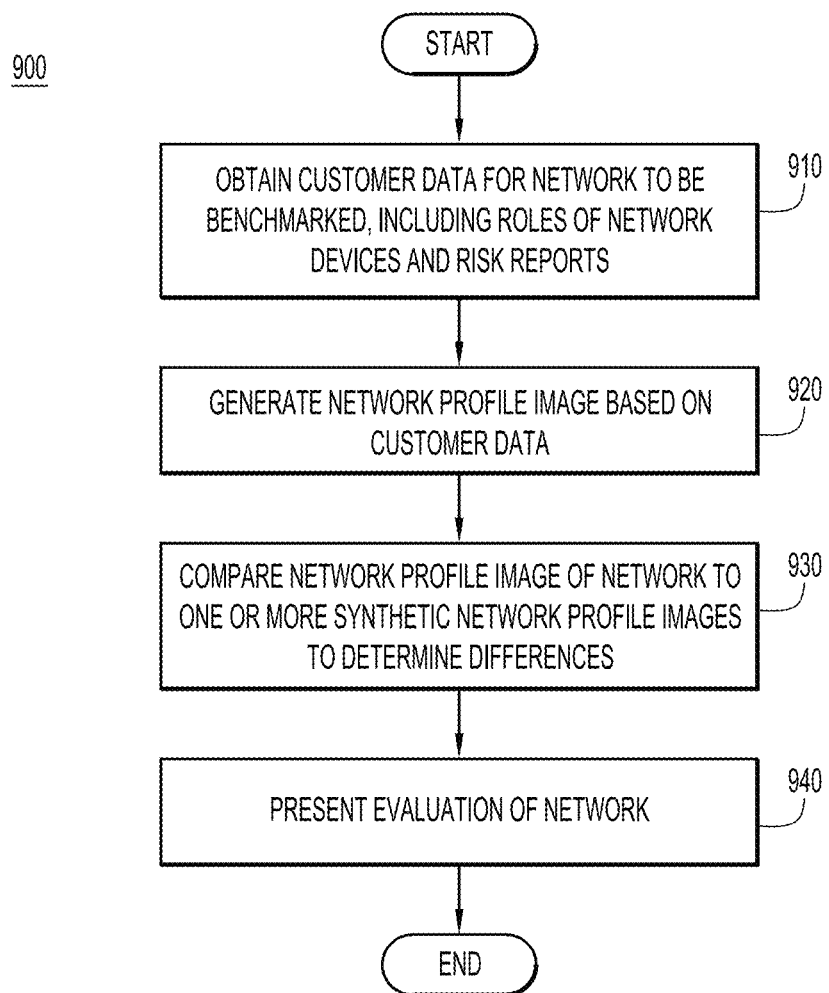
FIG. 9 is a flow chart depicting a method for performing peer risk benchmarking, in accordance with an example embodiment.

Referring to FIG. 9, FIG. 9 is a flow chart depicting a method 900 for performing peer risk benchmarking, in accordance with an example embodiment.

Customer data for a network to be benchmarked, including roles of network devices and risk reports, is obtained at operation 910. The customer data may include a description of roles of network devices and the topology of the network, as well as risk reports for each dimension of risk that is being assessed. For example, risk reports may include best practices, security advisories, field notices, bug reports, service requests, system logs, end-of-life reports, licensing reports, and the like. Additionally, risk reports can be divided into further dimensions based on the severity of reports, such as "low" or "high", for each risk report dimension.

A network profile image is generated based on the customer data at operation 920. Initially, a risk score may be determined for each dimension of risk based on the corresponding risk reports, descriptions of roles of network devices, and/or topology of the network. The resulting individual risk scores can together be converted into a network profile image that depicts risk across all assessed dimensions. For example, the risk scores may be used to construct a radar chart, such as radar chart 400 shown in FIG. 4, from which a polygon-shaped network profile image can be extracted. Transform operations and/or upscaling operations may be applied to finalize the network profile image, and may exaggerate features that represent risk in order to more easily identify differences between compared images.

The network profile image is compared to one or more synthetic network profile images to determine differences at operation 930. The shape and/or features of the network profile image may be compared to the shape and/or features of each synthetic network profile images, or both the network profile image and the one or more synthetic network profile images may be converted back to risk scores for each dimension of risk, which may then be compared.

An evaluation of the network is presented at operation 940. The evaluation may indicate how the evaluated network compares to peers in terms of risk for each dimension of risk that is assessed. For example, the evaluation may indicate to an organization that its network is falling behind its peers' networks in terms of a particular dimension of risk, such as end-of-life. Thus, the organization may update any commonly-used software and/or hardware indicated in the end-of-life reports in order to raise the organization's risk score in that dimension.

Figure 10:
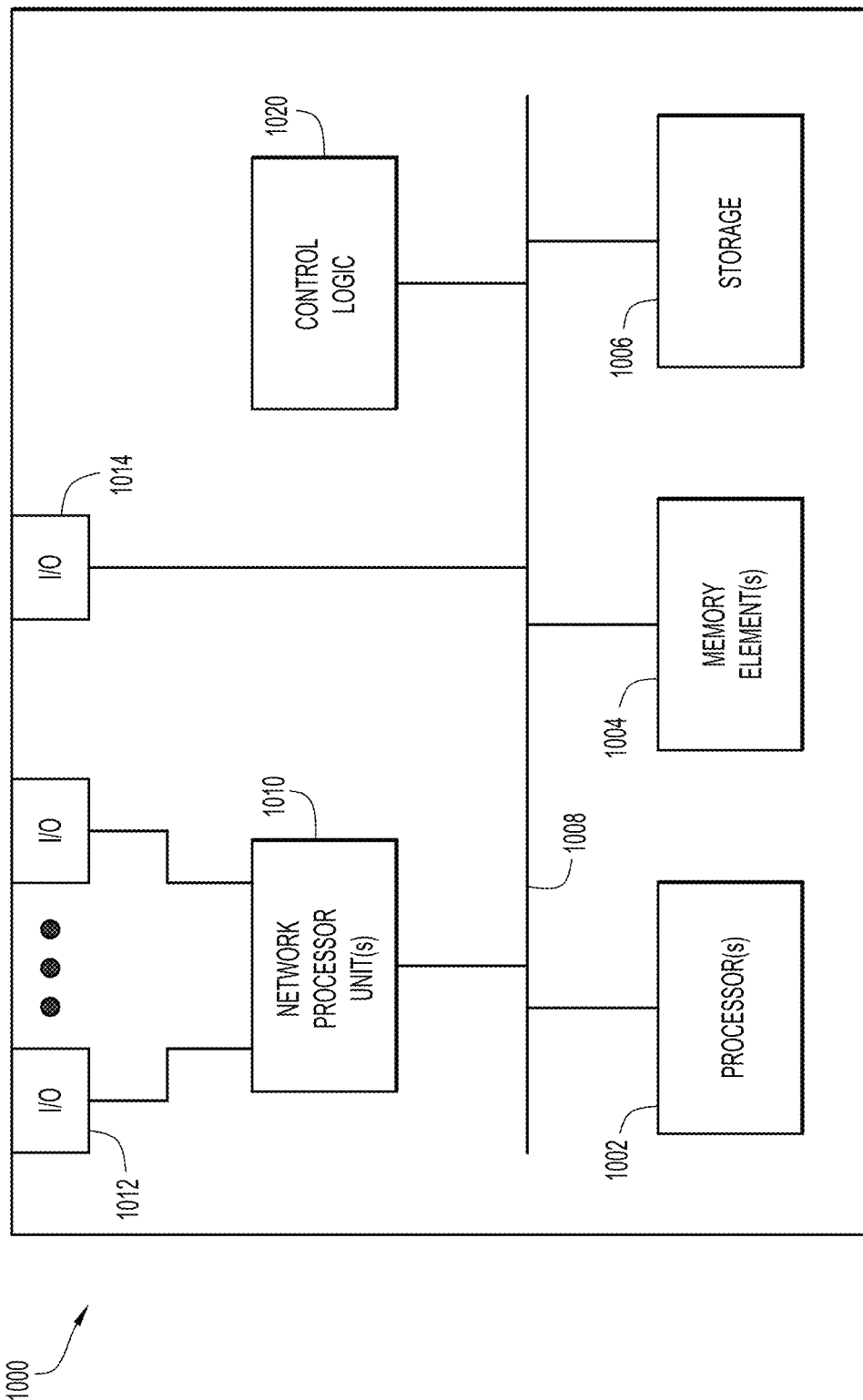
FIG. 10 is a block diagram depicting a computing device configured to modify a web application at runtime, in accordance with an example embodiment.

Referring to FIG. 10, FIG. 10 illustrates a hardware block diagram of a computing device 1000 that may perform functions associated with operations discussed herein in connection with the techniques depicted in FIGS. 1-9. In various embodiments, a computing device, such as computing device 1000 or any combination of computing devices 1000, may be configured as any entity/entities as discussed for the techniques depicted in connection with FIGS. 1-9 in order to perform operations of the various techniques discussed herein.

In at least one embodiment, the computing device 1000 may include one or more processor(s) 1002, one or more memory element(s) 1004, storage 1006, a bus 1008, one or more network processor unit(s) 1010 interconnected with one or more network input/output (I/O) interface(s) 1012, one or more I/O interface(s) 1014, and control logic 1020. In various embodiments, instructions associated with logic for computing device 1000 can overlap in any manner and are not limited to the specific allocation of instructions and/or operations described herein.

In at least one embodiment, processor(s) 1002 is/are at least one hardware processor configured to execute various tasks, operations and/or functions for computing device 1000 as described herein according to software and/or instructions configured for computing device 1000. Processor(s) 1002 (e.g., a hardware processor) can execute any type of instructions associated with data to achieve the operations detailed herein. In one example, processor(s) 1002 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 1004 and/or storage 1006 is/are configured to store data, information, software, and/or instructions associated with computing device 1000, and/or logic configured for memory element(s) 1004 and/or storage 1006. For example, any logic described herein (e.g., control logic 1020) can, in various embodiments, be stored for computing device 1000 using any combination of memory element(s) 1004 and/or storage 1006. Note that in some embodiments, storage 1006 can be consolidated with memory element(s) 1004 (or vice versa), or can overlap/exist in any other suitable manner.

In at least one embodiment, bus 1008 can be configured as an interface that enables one or more elements of computing device 1000 to communicate in order to exchange information and/or data. Bus 1008 can be implemented with any architecture designed for passing control, data and/or information between processors, memory elements/storage, peripheral devices, and/or any other hardware and/or software components that may be configured for computing device 1000. In at least one embodiment, bus 1008 may be implemented as a fast kernel-hosted interconnect, potentially using shared memory between processes (e.g., logic), which can enable efficient communication paths between the processes.

In various embodiments, network processor unit(s) 1010 may enable communication between computing device 1000 and other systems, entities, etc., via network I/O interface(s) 1012 to facilitate operations discussed for various embodiments described herein. In various embodiments, network processor unit(s) 1010 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 1000 and other systems, entities, etc. to facilitate operations for various embodiments described herein. In various embodiments, network I/O interface(s) 1012 can be configured as one or more Ethernet port(s), Fibre Channel ports, and/or any other I/O port(s) now known or hereafter developed. Thus, the network processor unit(s) 1010 and/or network I/O interface(s) 1012 may include suitable interfaces for receiving, transmitting, and/or otherwise communicating data and/or information in a network environment.

I/O interface(s) 1014 allow for input and output of data and/or information with other entities that may be connected to computer device 1000. For example, I/O interface(s) 1014 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 1020 can include instructions that, when executed, cause processor(s) 1002 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 1020) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 1004 and/or storage 1006 can store data, software, code, instructions (e.g., processor instructions), logic, parameters, combinations thereof, and/or the like used for operations described herein. This includes memory element(s) 1004 and/or storage 1006 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, entities for various embodiments described herein can encompass computing elements (which can include virtualized network elements, functions, etc.) such as, for example, laptop computers, tablet computers, netbook computers, personal computers (PCs), desktop computers, personal digital assistants (PDAs), smart phones, thin clients, network appliances, forwarders, routers, servers, switches, gateways, bridges, load balancers, firewalls, processors, modules, radio receivers/transmitters, or any other suitable device, component, element, or object operable to exchange information or execute computer readable program instructions as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

The programs described herein are identified based upon the application for which they are implemented in a specific embodiment. However, it should be appreciated that any particular program nomenclature herein is used merely for convenience, and thus the described embodiments should not be limited to use solely in any specific application identified and/or implied by such nomenclature.

In one form, a method is provided comprising: obtaining customer data for a first network, wherein the customer data comprises a role of one or more network devices in the first network and a plurality of risk reports corresponding to the one or more network devices, and wherein each risk report is associated with a particular dimension of a plurality of dimensions of risk for the one or more network devices, generating a network profile image by processing the plurality of risk reports, using a generative adversarial network, generating a synthetic network profile image from the network profile image, wherein the synthetic network profile image does not include the customer data, and evaluating a second network using the synthetic network profile image to identify differences between the first network and the second network.

In another form, the method further includes evaluating of the second network by identifying differences between the second network and one or more additional networks using one or more synthetic profile images corresponding to the one or more additional networks.

In another form, the network profile image is generated based on a plurality of risk scores, wherein each risk score corresponds to a dimension of risk of the plurality of dimensions of risk. In another form, the network profile image is descriptive of a polygon having vertices defined by the plurality of risk scores represented in a multidimensional model that corresponds to the plurality of dimensions of risk.

In another form, evaluating the second network using the synthetic network profile image includes generating a second network profile image for the second network by processing customer data of the second network, and comparing the second network profile image to the synthetic network profile image to identify differences, in the plurality of dimensions of risk, between the first network and the second network.

In another form, the generative adversarial network upsamples the network profile image, and wherein generating the synthetic network profile image is based on the upsampled network profile image.

In another form, the plurality of dimensions of risk include one or more of: a best practices dimension, a security advisories dimension, a field notices dimension, an end-of-life dimension, a network topology dimension, a network device roles dimension, a service request dimension, a bug report dimension, a service request dimension, and a system log dimension.

In one form, a computer system is provided, comprising: one or more computer processors; one or more computer readable storage media; program instructions stored on the one or more computer readable storage media for execution by at least one of the one or more computer processors, the program instructions comprising instructions to: obtain customer data for a first network, wherein the customer data comprises a role of one or more network devices in the first network and a plurality of risk reports corresponding to the one or more network devices, and wherein each risk report is associated with a particular dimension of a plurality of dimensions of risk for the one or more network devices, generate a network profile image by processing the plurality of risk reports, use a generative adversarial network, generating a synthetic network profile image from the network profile image, wherein the synthetic network profile image does not include the customer data, and evaluate a second network using the synthetic network profile image to identify differences between the first network and the second network.

In one form, one or more computer readable storage media is provided, the one or more computer readable storage media collectively having program instructions embodied therewith, the program instructions executable by a computer to cause the computer to: obtain customer data for a first network, wherein the customer data comprises a role of one or more network devices in the first network and a plurality of risk reports corresponding to the one or more network devices, and wherein each risk report is associated with a particular dimension of a plurality of dimensions of risk for the one or more network devices, generate a network profile image by processing the plurality of risk reports, use a generative adversarial network, generating a synthetic network profile image from the network profile image, wherein the synthetic network profile image does not include the customer data, and evaluate a second network using the synthetic network profile image to identify differences between the first network and the second network The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    obtaining customer data for a first network, wherein the customer data indicates a role of one or more network devices in the first network and a plurality of risk reports corresponding to the one or more network devices, wherein each risk report is associated with one of a plurality of dimensions of risk that include a recommended configuration of hardware or software of the first network;
    generating a network profile image by processing the plurality of risk reports;
    generating a synthetic network profile image from the network profile image, wherein the synthetic network profile image does not include the customer data;
    evaluating a second network using the synthetic network profile image using a second network profile image generated by processing a second plurality of risk reports corresponding to a second plurality of dimensions of risk of the second network by comparing the synthetic network profile image to the second network profile image; and
    identifying differences between the first network and the second network based on a comparison of the plurality of dimensions of risk to the second plurality of dimensions of risk.

2. The computer-implemented method of claim 1, further comprising:
    determining to implement the recommended configuration of hardware or software, the software to be installed, or the hardware to be upgraded based on the evaluating of the second network using the synthetic network profile image.

3. The computer-implemented method of claim 1, wherein the synthetic network profile image is generated from the network profile image using a generative adversarial network.

4. The computer-implemented method of claim 1, wherein the plurality of dimensions of risk further include one or more of: software to be installed, and hardware to be upgraded.

5. The computer-implemented method of claim 1, wherein the evaluating of the second network comprises identifying differences between the second network and one or more additional networks using one or more synthetic profile images corresponding to the one or more additional networks.

6. The computer-implemented method of claim 1, wherein evaluating the second network using the synthetic network profile image comprises:

generating a second network profile image for the second network by processing customer data of the second network; and comparing the second network profile image to the synthetic network profile image to identify differences, in the plurality of dimensions of risk, between the first network and the second network.

7. The computer-implemented method of claim 1, wherein the plurality of dimensions of risk further include one or more of: a best practices dimension, a security advisories dimension, a field notices dimension, an end-of-life dimension, a network topology dimension, a network device roles dimension, a service request dimension, a bug report dimension, and a system log dimension.

8. A computer system comprising:
one or more computer processors;
one or more computer readable storage media;
program instructions stored on the one or more computer readable storage media for execution by at least one of the one or more computer processors, the program instructions comprising instructions to:
obtain customer data for a first network, wherein the customer data indicates a role of one or more network devices in the first network and a plurality of risk reports corresponding to the one or more network devices, wherein each risk report is associated with one of a plurality of dimensions of risk that include a recommended configuration of hardware or software of the first network;
generate a network profile image by processing the plurality of risk reports;
generate a synthetic network profile image from the network profile image, wherein the synthetic network profile image does not include the customer data;
evaluate a second network using the synthetic network profile image using a second network profile image generated by processing a second plurality of risk reports corresponding to a second plurality of dimensions of risk of the second network by comparing the synthetic network profile image to the second network profile image; and
identify differences between the first network and the second network based on a comparison of the plurality of dimensions of risk to the second plurality of dimensions of risk.

9. The computer system of claim 8, wherein the program instructions further comprise instructions to:
determine to implement the recommended configuration of hardware or software, the software to be installed, or the hardware to be upgraded based on the evaluating of the second network using the synthetic network profile image.

10. The computer system of claim 8, wherein the synthetic network profile image is generated from the network profile image using a generative adversarial network.

11. The computer system of claim 8, wherein the plurality of dimensions of risk further include one or more of: software to be installed, and hardware to be upgraded.

12. The computer system of claim 8, wherein the evaluating of the second network comprises identifying differences between the second network and one or more additional networks using one or more synthetic profile images corresponding to the one or more additional networks.

13. The computer system of claim 8, wherein the program instructions to evaluate the second network using the synthetic network profile image comprise instructions to:

generating a second network profile image for the second network by processing customer data of the second network; and comparing the second network profile image to the synthetic network profile image to identify differences, in the plurality of dimensions of risk, between the first network and the second network.

14. The computer system of claim 8, wherein the plurality of dimensions of risk further include one or more of: a best practices dimension, a security advisories dimension, a field notices dimension, an end-of-life dimension, a network topology dimension, a network device roles dimension, a service request dimension, a bug report dimension, and a system log dimension.

15. A computer program product comprising one or more computer readable storage media collectively having program instructions embodied therewith, the program instructions executable by a computer to cause the computer to:
obtain customer data for a first network, wherein the customer data indicates a role of one or more network devices in the first network and a plurality of risk reports corresponding to the one or more network devices, wherein each risk report is associated with one of a plurality of dimensions of risk that include a recommended configuration of hardware or software of the first network;
generate a network profile image by processing the plurality of risk reports;
generate a synthetic network profile image from the network profile image, wherein the synthetic network profile image does not include the customer data;
evaluate a second network using the synthetic network profile image using a second network profile image generated by processing a second plurality of risk reports corresponding to a second plurality of dimensions of risk of the second network by comparing the synthetic network profile image to the second network profile image; and
identify differences between the first network and the second network based on a comparison of the plurality of dimensions of risk to the second plurality of dimensions of risk.

16. The computer program product of claim 15, wherein the program instructions further cause the computer to:
determine to implement the recommended configuration of hardware or software, the software to be installed, or the hardware to be upgraded based on the evaluating of the second network using the synthetic network profile image.

17. The computer program product of claim 15, wherein the synthetic network profile image is generated from the network profile image using a generative adversarial network.

18. The computer program product of claim 15, wherein the plurality of dimensions of risk further include one or more of: software to be installed, and hardware to be upgraded.

19. The computer program product of claim 15, wherein the evaluating of the second network comprises identifying differences between the second network and one or more additional networks using one or more synthetic profile images corresponding to the one or more additional networks.

20. The computer program product of claim 15, wherein the program instructions to evaluate the second network using the synthetic network profile image cause the computer to:

generating a second network profile image for the second network by processing customer data of the second network; and comparing the second network profile image to the synthetic network profile image to identify differences, in the plurality of dimensions of risk, between the first network and the second network.

\* \* \* \* \*